United States Patent
Ono et al.

(10) Patent No.: US 9,518,166 B2
(45) Date of Patent: Dec. 13, 2016

(54) FILM FORMING AUXILIARY AGENT COMPOSITION FOR EMULSION RESIN

(71) Applicant: ADEKA CORPORATION, Tokyo (JP)

(72) Inventors: Takashi Ono, Tokyo (JP); Hiroaki Shirai, Tokyo (JP); Masaki Hosaka, Tokyo (JP)

(*) Notice: Subject to any disclaimer, the term of this patent is extended or adjusted under 35 U.S.C. 154(b) by 0 days.

(21) Appl. No.: 15/024,154

(22) PCT Filed: Oct. 24, 2013

(86) PCT No.: PCT/JP2013/078823
§ 371 (c)(1),
(2) Date: Mar. 23, 2016

(87) PCT Pub. No.: WO2015/059796
PCT Pub. Date: Apr. 30, 2015

(65) Prior Publication Data
US 2016/0237242 A1    Aug. 18, 2016

(51) Int. Cl.
| | | |
|---|---|---|
| *C08K 5/11* | (2006.01) | |
| *C08K 5/09* | (2006.01) | |
| *C09D 7/12* | (2006.01) | |
| *C09D 133/00* | (2006.01) | |
| *C09D 175/04* | (2006.01) | |
| *C09J 133/00* | (2006.01) | |
| *C09J 175/04* | (2006.01) | |
| *C08L 33/00* | (2006.01) | |
| *C08L 75/04* | (2006.01) | |

(52) U.S. Cl.
CPC . *C08K 5/11* (2013.01); *C08K 5/09* (2013.01); *C08L 33/00* (2013.01); *C08L 75/04* (2013.01); *C09D 7/12* (2013.01); *C09D 7/1233* (2013.01); *C09D 133/00* (2013.01); *C09D 175/04* (2013.01); *C09J 133/00* (2013.01); *C09J 175/04* (2013.01)

(58) Field of Classification Search
CPC .......... C08K 5/11; C08K 5/09; C09D 133/00; C09D 7/1233
See application file for complete search history.

(56) References Cited

U.S. PATENT DOCUMENTS 7,981,956 B2 * 7/2011 Gota et al. ............... C08K 5/05
524/379

FOREIGN PATENT DOCUMENTS

| JP | 2000-103930 | * | 4/2000 |
| JP | 2002-53817 | * | 2/2002 |
| JP | 2005-200611 | * | 7/2005 |

OTHER PUBLICATIONS

International Search Report issued Nov. 19, 2013 in corresponding (PCT) Application No. PCT/JP2013/078823.

* cited by examiner

*Primary Examiner* — Robert Harlan

(57) ABSTRACT

A film forming auxiliary agent composition for an emulsion resin in accordance with the present invention is characterized in that containing a specific ester compound (A) and a specific fatty acid (B), and having an acid value of 0.05 to 5 mg KOH/g, said composition has low odor, a high boiling point and good film forming ability, and the emulsion resin that is blended with said composition has good long-term storage stability.

8 Claims, No Drawings

FILM FORMING AUXILIARY AGENT COMPOSITION FOR EMULSION RESIN

TECHNICAL FIELD

This invention relates to a film forming auxiliary agent composition for an emulsion resin, which has good product stability and which imparts good long-term storage stability to a emulsion resin in which it is blended.

BACKGROUND ART

Since emulsion resins include water as a solvent and are safe in terms of flammability and toxicity, they have been widely used for adhesives, paints and the like. Generally, the lowest temperature at which an emulsion resin forms a continuous film on drying is called a minimum film forming temperature (MFT). The MFT differs depending on the type, composition or the like of the emulsion resin, but the MFT of generally used emulsion resins is within a range of 10° C. to 70° C. Therefore, problems arose, particularly, when an emulsion is used in winter, such as where the emulsion is dried at a temperature lower than the MFT, no transparent continuous film is formed and whitens, cases where sufficient performance cannot be demonstrated or decorative properties of the film are degraded. Among such resins, the MFT of acrylic emulsion resins is particularly high, and for a large number of emulsions, sufficient adhesive strength cannot be obtained even in summer. For this reason, although treatments such as performing forced heating or ensuring sufficient temperature when the film is formed are conducted, long-term treatment at high temperature is required, and therefore a film forming aid that makes it possible to reduce the MFT and form a coating film over a short period of time is needed.

Generally, a plasticizer or a solvent with a high boiling point is added as the film forming auxiliary agent. Dibutyl phthalate, dimethyl phthalate, and tricresyl phosphate are typically added as the plasticizer, and butyl cellosolve, butyl carbitol, and N-methylpyrrolidone are typically added as the solvent with a high boiling point. In particular, dibutyl phthalate is generally used because of low cost and good stability of the plasticized emulsion, but the film forming ability thereof is not very good and a large amount thereof is needed to obtain an emulsion capable of forming a film at a low temperature. Other drawbacks are that the formed film is plasticized too much, the heat resistance of the film is decreased, and creep easily occurs under load. Further, the use of phthalic acid esters typified by dibutyl phthalate has been avoided since as environmental hormones, they have been indicated as causing reproductive abnormalities.

On the other hand, the drawbacks of solvents with a high boiling point, such as butyl cellosolve, butyl carbitol, and N-methylpyrrolidone, are that they include peculiar odors and reduce the water resistance of the formed films. Although superior to dibutyl phthalate in film forming property, the performance thereof can hardly be termed sufficient. Further, such solvents raise concerns about their adverse effects on humans and are regulated as volatile organic compounds (VOC). The use thereof is thus limited. More specifically, in order to suppress the emission of organic compounds released into the atmosphere, the emission amount of organic compounds has been regulated by the Japanese Air Pollution Control Law, but since compounds with a boiling point of 260° C. or lower have an increased emission amount, it is desirable that organic compounds with a boiling point of 260° C. or higher be used as the film forming auxiliary agents.

A variety of such compounds have been studied as film forming auxiliary agents, and film forming auxiliary agents constituted by specific ester compounds thereamong have been confirmed to have a high boiling point, no odor, and good film forming ability. For example, Patent Document 1 discloses a film forming auxiliary agent for an acrylic emulsion resin, which is constituted by a compound having 2 ester bonds and 1 to 10 ether bonds.

PRIOR ART DOCUMENTS

Patent Documents

Patent Document 1: JP 2005-200611 A

SUMMARY OF INVENTION

Problem to be Solved by the Invention

However, where an emulsion resin blended with the film forming auxiliary agent described in Patent Document 1 is stored for a long time, problems, such as separation and sedimentation, occur and the emulsion is difficult to use.

Accordingly, a problem to be solved by the present invention is to provide a film forming auxiliary agent composition for an emulsion resin which has low odor, a high boiling point, good film forming ability and provides good long-term storage stability of the emulsion resin to which it is blended.

Means for Solving the Problem

The comprehensive research conducted by the inventors led to the discovery of a film forming auxiliary agent composition for an emulsion resin, which imparts good long-term storage stability to an emulsion resin in which it is blended while maintaining good ability as a film forming aid, and to the creation of the present invention.

Thus, the present invention provides a film forming auxiliary agent composition for an emulsion resin, including an ester compound (A) represented by general formula (1) and/or general formula (2) below, and a fatty acid (B) represented by general formula (3) and/or general formula (4), and having an acid value of 0.05 to 5 mgKOH/g:

[Chemical Formula 1]

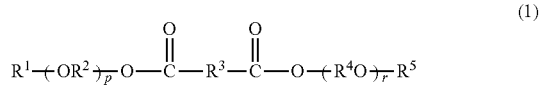

(1)

(wherein $R^1$ and $R^5$ each represent a hydrocarbon group having a carbon number from 1 to 10; $R^2$ and $R^4$ each represent an alkylene group having a carbon number from 2 to 4; $R^3$ represents an alkylene group having a carbon number from 1 to 15; and p and r each represent a number from 1 to 5);

[Chemical Formula 2]

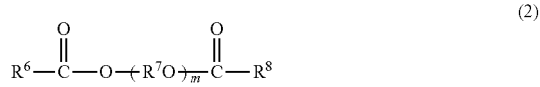

(2)

(wherein $R^6$ and $R^8$ each represent a hydrocarbon group having a carbon number from 1 to 10; $R^7$ represents an alkylene group having a carbon number from 2 to 4; and m represents a number from 2 to 10);

(wherein $R^9$ represents an alkylene group having a carbon number from 1 to 15);

(wherein $R^{10}$ represents a hydrocarbon group having a carbon number from 1 to 10).

Effects of Invention

An effect of the present invention is in providing a film forming auxiliary agent composition for an emulsion resin which has low odor, a high boiling point, good film forming ability and which provides good long-term storage stability for an emulsion resin that is blended with said composition.

BEST MODE FOR CARRYING OUT THE INVENTION

The ester compounds (A) suitable for the film forming auxiliary agent composition for an emulsion resin in accordance with the present invention are represented by the following general formula (1) or general formula (2):

[Chemical Formula 3]

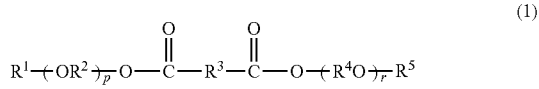

$R^1$ and $R^5$ in the general formula (1) each represent a hydrocarbon group having a carbon number from 1 to 10. Examples of such hydrocarbon groups include alkyl groups such as methyl group, ethyl group, propyl group, isopropyl group, butyl group, isobutyl group, secondary butyl group, tertiary butyl group, pentyl group, isopentyl group, secondary pentyl group, hexyl group, isohexyl group, secondary hexyl group, heptyl group, isoheptyl group, secondary heptyl group, octyl group, isooctyl group, secondary octyl group, nonyl group, isononyl group, secondary nonyl group, decyl group, and isodecyl group; alkenyl groups such as vinyl group, allyl group, propenyl group, isopropenyl group, butenyl group, isobutenyl group, pentenyl group, isopentenyl group, hexenyl group, heptenyl group, octenyl group, nonenyl group, and decenyl group; aryl groups such as phenyl group, toluyl group, xylyl group, and cumenyl group; and cycloalkyl groups such as cyclopentyl group, cyclohexyl group, cycloheptyl group, methylcyclopentyl group, and methylcyclohexyl group. Among them, hydrocarbons having a carbon number from 2 to 8 are preferred, hydrocarbon groups having a carbon number from 3 to 6 are more preferred, and alkyl groups having a carbon number from 3 to 6 are even more preferred because the MFT decreases. Where the carbon number is more than 10, miscibility with the emulsion resin is degraded and adverse effects such as thickening of the emulsion can occur.

$R^3$ in the general formula (1) represents an alkylene group having a carbon number from 1 to 15. Examples of such alkylene groups include alkylene groups such as methylene group, ethylene group, propylene group, isopropylene group, butylene group, isobutylene group, pentylene group, isopentylene group, hexylene group, isohexylene group, heptylene group, isoheptylene group, octylene group, isooctylene group, nonylene group, isononylene group, decylene group, isodecylene group, undecylene group, isoundecylene group, dodecylene group, isododecylene group, tridecylene group, isotridecylene group, tetradecylene group, isotetradecylene group, pentadecylene group, and isopentadecylene group; and arylene groups such as phenylene group, methylphenylene group, dimethylphenylene group, ethylphenylene group, propylphenylene group, butylphenylene group, and naphthalene group. Among them, alkylene groups are preferred because the MFT decreases, and alkylene groups having a carbon number from 1 to 4 or 8 are more preferred because raw materials are easy to acquire.

$R^2$ and $R^4$ in the general formula (1) each represent an alkylene group having a carbon number from 2 to 4. Examples of such group include ethylene group, propylene group, isopropylene group, butylene group, and isobutylene group. Among them, ethylene group is preferred because of good miscibility with the emulsion resin and a high effect of lowering the MFT.

In the general formula (1), p and r each represent a number from 1 to 5, but from the standpoint of good film forming ability, numbers from 2 to 4 are preferred. Where p and r are greater than 5, the film forming ability can be insufficient. When p and r are numbers equal to or greater than 2, the corresponding $R^2$ and $R^4$ correspondingly include 2 or more groups, and those groups may all be the same or different.

No method for manufacturing the compound represented by the general formula (1) is designated, but from the standpoint of easiness of production and cost of raw materials, it is preferred that 1 mole of a dicarboxylic acid be esterified with 2 moles of a monovalent alcohol alcoxylate. Examples of the dicarboxylic acid include methanedicarboxylic acid, ethanedicarboxylic acid, propanedicarboxylic acid, butanedicarboxylic acid, pentanedicarboxylic acid, hexanedicarboxylic acid, heptanedicarboxylic acid, octanedicarboxylic acid, nonanedicarboxylic acid, decanedicarboxylic acid, undecanedicarboxylic acid, dodecanedicarboxylic acid, tridecanedicarboxylic acid, tetradecanedicarboxylic acid, and pentadecanedicarboxylic acid.

[Chemical Formula 4]

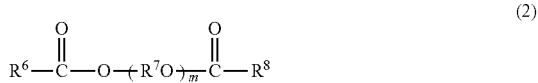

$R^6$ and $R^8$ in the general formula (2) each represent a hydrocarbon group having a carbon number from 1 to 10. Examples of such hydrocarbon groups include alkyl groups such as methyl group, ethyl group, propyl group, isopropyl group, butyl group, isobutyl group, secondary butyl group, tertiary butyl group, pentyl group, isopentyl group, secondary pentyl group, hexyl group, isohexyl group, secondary hexyl group, heptyl group, isoheptyl group, secondary heptyl group, octyl group, isooctyl group, secondary octyl group, nonyl group, isononyl group, secondary nonyl group, decyl group, and isodecyl group; alkenyl groups such as vinyl group, allyl group, propenyl group, isopropenyl group, butenyl group, isobutenyl group, pentenyl group, isopentenyl group, hexenyl group, heptenyl group, octenyl group, nonenyl group, and decenyl group; aryl groups such as phenyl group, toluyl group, xylyl group, and cumenyl group;

and cycloalkyl groups such as cyclopentyl group, cyclohexyl group, cycloheptyl group, methylcyclopentyl group, and methylcyclohexyl group. Among them, hydrocarbons having a carbon number from 2 to 8 are preferred, hydrocarbon groups having a carbon number from 3 to 6 are more preferred, and alkyl groups having a carbon number from 3 to 6 are even more preferred because the MFT decreases. Where the carbon number is more than 10, miscibility with the emulsion resin is degraded and adverse effects such as thickening of the emulsion can occur.

$R^7$ in the general formula (2) represents an alkylene group having a carbon number from 2 to 4. Examples of such groups include ethylene group, propylene group, isopropylene group, butylene group, and isobutylene group. Among them, ethylene group is preferred because of good miscibility with the emulsion resin and a high effect of lowering the MFT.

In the general formula (2), m represents a number from 2 to 10, but from the standpoint of good film forming ability, a number from 2 to 8 is preferred and a number from 2 to 5 is even more preferred. When the number is less than 2, the ability of blending with the emulsion resin can be degraded, and where the number is greater than 10, the film forming ability can be insufficient. Further, $R^7$ corresponding to m includes two or more groups, and those groups may all be the same or different.

No method for manufacturing the compound represented by the general formula (2) is designated, but from the standpoint of easiness of production and cost of raw materials, it is preferred that 1 mole of polyalkylene glycol be esterified with 2 moles of a monovalent fatty acid. Examples of the monovalent fatty acids include alkyl fatty acids such as acetic acid, propionic acid, butanoic acid (butyric acid), pentanoic acid, isopentanoic acid, hexanoic acid, heptanoic acid, isoheptanoic acid, octanoic acid, 2-ethylhexanoic acid, isooctanoic acid, nonanoic acid, isononanoic acid, decanoic acid, isodecanoic acid, undecanoic acid, and isoundecanoic acid, and aromatic carboxylic acids such as benzoic acid, methylbenzoic acid, ethylbenzoic acid, propylbenzoic acid, isopropylbenzoic acid, butylbenzoic acid, and tertiary butylbenzoic acid. It may also be a mixed fatty acid obtained from a natural oil or fat with an adjusted chain length of fatty acid. Examples of natural oils and fats include vegetable oils and fats such as linseed oil, perilla oil, oiticica oil, olive oil, cacao oil, kapok oil, white mustard oil, sesame oil, rice bran oil, safflower oil, shea nut oil, china wood oil, soybean oil, tea seed oil, camellia oil, corn oil, rapeseed oil, palm oil, palm kernel oil, castor oil, sunflower seed oil, cottonseed oil, coconut oil, wood wax, and peanut oil, and animal oils and fats such as horse fat, beef tallow, neat's foot fat, butter fat, lard, goat fat, mutton tallow, milk fat, fish oil, and whale oil.

The ester compound (A) is a compound represented by the general formula (1) and general formula (2), and the compounds represented by those formulas may be used individually as the ester compound (A), or may be mixed to obtain the ester compound (A). To obtain a strong effect of decreasing the MFT, it is preferred that the compound represented by the general formula (1) be included, and it is more preferred that the compound represented by the general formula (1) be used alone.

The fatty acid (B) suitable for the film forming auxiliary agent composition for an emulsion resin in accordance with the present invention is represented by the following general formula (3) or general formula (4):

$$\text{HOOC}-R^9-\text{COOH} \qquad (3)$$

$R^9$ in the general formula (3) represents an alkylene group having a carbon number from 1 to 15. Examples of such alkylene groups include alkylene groups such as methylene group, ethylene group, propylene group, isopropylene group, butylene group, isobutylene group, pentylene group, isopentylene group, hexylene group, isohexylene group, heptylene group, isoheptylene group, octylene group, isooctylene group, nonylene group, isononylene group, decylene group, isodecylene group, undecylene group, isoundecylene group, dodecylene group, isododecylene group, tridecylene group, isotridecylene group, tetradecylene group, isotetradecylene group, pentadecylene group, and isopentadecylene group, and arylene groups such as phenylene group, methylphenylene group, dimethylphenylene group, ethylphenylene group, propylphenylene group, butylphenylene group, and naphthalene group. Among them, alkylene groups are preferred because the MFT decreases, and alkylene groups having a carbon number from 1 to 4 or 8 are more preferred because raw materials are easy to acquire.

$$R^{10}-\text{COOH} \qquad (4)$$

$R^{10}$ in the general formula (4) represents a hydrocarbon group having a carbon number from 1 to 10. Examples of such hydrocarbon groups include alkyl groups such as methyl group, ethyl group, propyl group, isopropyl group, butyl group, isobutyl group, secondary butyl group, tertiary butyl group, pentyl group, isopentyl group, secondary pentyl group, hexyl group, isohexyl group, secondary hexyl group, heptyl group, isoheptyl group, secondary heptyl group, octyl group, isooctyl group, secondary octyl group, nonyl group, isononyl group, secondary nonyl group, decyl group, and isodecyl group; alkenyl groups such as vinyl group, allyl group, propenyl group, isopropenyl group, butenyl group, isobutenyl group, pentenyl group, isopentenyl group, hexenyl group, heptenyl group, octenyl group, nonenyl group, and decenyl group; aryl groups such as phenyl group, toluyl group, xylyl group, and cumenyl group; and cycloalkyl groups such as cyclopentyl group, cyclohexyl group, cycloheptyl group, methylcyclopentyl group, and methylcyclohexyl group. Among them, hydrocarbons having a carbon number from 2 to 8 are preferred, hydrocarbon groups having a carbon number from 3 to 6 are more preferred, and alkyl groups having a carbon number from 3 to 7 are even more preferred because the MFT decreases. Where the carbon number is more than 10, miscibility with the emulsion resin is degraded and an adverse effect such as thickening of the emulsion can occur.

The fatty acid (B) is a compound represented by the general formula (3) and general formula (4), and the compounds represented by those formulas may be used individually or in a mixture, but where a compound represented by the general formula (1) is used as the ester compound (A), it is preferred that a compound represented by the general formula (3) be used, and where a compound represented by the general formula (2) is used as the ester compound (A), it is preferred that a compound represented by the general formula (4) be used.

The compounding ratio of the ester compound (A) and the fatty acid (B) in the film forming auxiliary agent composition in accordance with the present invention is determined by the acid value of the entire film forming auxiliary agent composition. Where the compounded amount of the fatty acid (B) is large, the acid value rises, and where the compounded amount is small, the acid value decreases. More specifically, the acid value needs to be 0.05 mgKOH/g to 5 mgKOH/g, preferably 0.1 mgKOH/g to 3 mgKOH/g. Where the acid value is less than 0.05 mgKOH/g, the long-term storage stability of the blended emulsion resin is degraded, and where the acid value is greater than 5 mgKOH/g, separation or sediments can occur in blending with the emulsion resin, or water resistance at the time of coating the blended emulsion resin can decrease, or the long-term storage stability can degrade.

The improvement of long-term stability of the emulsion resin, which is the advantageous effect of the present invention, is felt to be due to the blending of the fatty acid (B). The mechanism thereof is unclear, but it is presumed that since the emulsion resins are usually alkaline, the fatty acid (B) becomes a fatty acid salt in the emulsion resin and this salt acts as a surfactant and improves the dispersivity of the entire emulsion resin. Further, although the fatty acid salt constituted by the fatty acid (B) has a poor balance of hydrophilic groups and hydrophobic groups and the function thereof as a surfactant is expected not to be high, the effect of the present invention cannot be obtained by using a surfactant generally termed as a highly functional surfactant.

It is further preferred that the film forming auxiliary agent composition in accordance with the present invention be insoluble in water. When it is soluble in water, water resistance of the resin film to which the composition is added can be decreased and physical properties of the resin can be degraded. Whether the composition is insoluble in water can be determined by the following method:

A total of 5 parts by mass of the film forming auxiliary agent composition, which is the object of measurements, is added to 95 parts by mass of pure water and the temperature of the entire system is set to 25° C. The entire system is then stirred for 5 min with a stirrer to ensure effective mixing. After the stirring has been stopped, the system is allowed to stay for 30 min in a thermostat at 25° C., and where the system is completely separated into two layers, it is determined to be "insoluble in water". Where the entire system is uniformly dissolved, or the entire system is emulsified and becomes cloudy, or when the system is separated, but an emulsion layer appears on the boundary with water, the system is not determined to be "insoluble in water".

The emulsion resin composition in accordance with the present invention is obtained by adding the film forming auxiliary agent composition in accordance with the present invention to an emulsion resin, and the film forming auxiliary agent composition in accordance with the present invention is contained at 0.1 mass % to 10 mass %, preferably 0.5 mass % to 8 mass % based on the total amount of the emulsion resin composition. The type of the emulsion resins that can be used is not particularly specified, and suitable examples thereof include acrylate emulsions, styrene emulsions, vinyl acetate emulsions, urethane emulsions, epoxy emulsions, SBR (styrene/butadiene) emulsions, ABS (acrylonitrile/butadiene/styrene) emulsions, BR (butadiene) emulsions, IR (isoprene) emulsions, and NBR (acrylonitrile/butadiene) emulsions.

Well known additives, for example, a white pigment such as titanium dioxide, calcium carbonate, barium carbonate, and kaolin, a pigment, for example, a colored-system pigment such as carbon black, red ocher, and cyanine blue, an antioxidant, a UV absorber, an agent improving water resistance, a preservation antimicrobial agent, an insect-killing germicide, a solvent, a plasticizer, a dispersant, a thickening agent, a defoaming agent, a deodorizer, perfume, an extender, and a dye can be used in the emulsion resin composition in accordance with the present invention in a range in which the advantageous effects of the present invention are not impaired. The emulsion resin composition in accordance with the present invention can be used for aqueous coatings, pressure-sensitive adhesives, adhesives, and the like.

EXAMPLES

The present invention will be described hereinbelow in greater detail on the basis of examples thereof.

<Test Emulsion Resin>
Emulsion resins of the following two types were used for testing.
Resin 1: acrylic emulsion resin (Mowinyl 6520, manufactured by Nippon Synthetic Chemical Industry Co., Ltd.)
Resin 2: urethane emulsion resin (HUX-370, manufactured by ADEKA CORPORATION)
<Test Samples>
The test samples represented by the general formula (1) are described in Table 1 below.

TABLE 1

|  | $R^1$ | $R^2$ | p | $R^3$ | $R^4$ | r | $R^5$ |
|---|---|---|---|---|---|---|---|
| A-1 | methyl | ethylene | 3 | ethylene | ethylene | 3 | methyl |
| A-2 | butyl | ethylene | 3 | ethylene | ethylene | 3 | butyl |
| A-3 | butyl | ethylene | 3 | octylene | ethylene | 3 | butyl |
| A-4 | butyl | propylene | 3 | ethylene | propylene | 3 | butyl |
| A-5 | butyl | ethylene | 5 | ethylene | ethylene | 5 | butyl |
| A-6 | dodecyl | ethylene | 3 | ethylene | ethylene | 3 | dodecyl |

The test samples represented by the general formula (2) are described in Table 2 below.

TABLE 2

|  | $R^6$ | $R^7$ | m | $R^8$ |
|---|---|---|---|---|
| A-7 | ethyl | ethylene | 5 | ethyl |
| A-8 | propyl | ethylene | 5 | propyl |
| A-9 | heptyl | ethylene | 5 | heptyl |
| A-10 | propyl | propylene | 5 | propyl |
| A-11 | propyl | ethylene | 8 | propyl |

B-1: ethanedicarboxylic acid [$R^9$ in the general formula (3) is ethylene]
B-2: octanedicarboxylic acid [$R^9$ in the general formula (3) is octylene]
B-3: butanoic acid [$R^{10}$ in the general formula (4) is propyl]
B-4: octylic acid [$R^{10}$ in the general formula (4) is heptyl]
C-1: butyl cellosolve
C-2: N-methylpyrrolidone
D-1: polyoxyethylene (10) dodecyl ether
D-2: sodium dodecylsulfate
<Production of Inventive Products>
Inventive Product 1: B-1 was compounded with A-1, and the acid value was adjusted to 0.5 mgKOH/g.
Inventive Product 2: B-1 was compounded with A-2, and the acid value was adjusted to 0.5 mgKOH/g.
Inventive Product 3: B-1 was compounded with A-3, and the acid value was adjusted to 0.5 mgKOH/g.
Inventive Product 4: B-1 was compounded with A-4, and the acid value was adjusted to 0.5 mgKOH/g.
Inventive Product 5: B-2 was compounded with A-5, and the acid value was adjusted to 0.5 mgKOH/g.
Inventive Product 6: B-1 was compounded with A-2, and the acid value was adjusted to 0.05 mgKOH/g.
Inventive Product 7: B-1 was compounded with A-2, and the acid value was adjusted to 0.1 mgKOH/g.
Inventive Product 8: B-1 was compounded with A-2, and the acid value was adjusted to 1 mgKOH/g.
Inventive Product 9: B-1 was compounded with A-2, and the acid value was adjusted to 5 mgKOH/g.
Inventive Product 10: B-3 was compounded with A-7, and the acid value was adjusted to 0.5 mgKOH/g.
Inventive Product 11: B-3 was compounded with A-8, and the acid value was adjusted to 0.5 mgKOH/g.
Inventive Product 12: B-3 was compounded with A-9, and the acid value was adjusted to 0.5 mgKOH/g.

Inventive Product 13: B-4 was compounded with A-10, and the acid value was adjusted to 0.5 mgKOH/g.

Inventive Product 14: B-4 was compounded with A-11, and the acid value was adjusted to 0.5 mgKOH/g.

<Production of Comparative Products>

Comparative Product 1: A-1

Comparative Product 2: A-2

Comparative Product 3: B-1 was compounded with A-2, and the acid value was adjusted to 0.03 mgKOH/g.

Comparative Product 4: B-1 was compounded with A-2, and the acid value was adjusted to 6 mgKOH/g.

Comparative Product 5: A-7

Comparative Product 6: B-3 was compounded with A-8, and the acid value was adjusted to 0.03 mgKOH/g.

Comparative Product 7: B-3 was compounded with A-8, and the acid value was adjusted to 6 mgKOH/g.

Comparative Product 8: D-1 was compounded with A-2, and the acid value was adjusted to 0.5 mgKOH/g.

Comparative Product 9: D-2 was compounded with A-8, and the acid value was adjusted to 0.5 mgKOH/g.

Comparative Product 10: C-1

Comparative Product 11: C-2

Comparative Product 12: B-1 was compounded with A-6, and the acid value was adjusted to 0.5 mgKOH/g.

<Test 1: Minimum Film Forming Temperature (MFT)>

The MFT was measured using a MINIMUM FILM FORMING TEMPERATURE BAR (manufactured by PHOPOINT Instrumentation Ltd.), which is a MFT measurement device.

More specifically, Inventive Products 1 to 14 and Comparative Products 1 to 12 were each compounded at 5 mass % with the test emulsion resins (resin 1 and resin 2), and coating films with a thickness of 75 μm were produced with a dedicated applicator on the MFT measurement device under a temperature gradient. The state of the coating film was observed after 1 h, the lowest temperature at which the film was formed without hair cracking was read and this temperature was taken as the MFT. The lower the MFT, the better the performance of the film forming auxiliary agent. With Comparative Product 12, complete separation has occurred and the coating film could not be produced with the applicator. At this point in time, the test was terminated.

<Test 2: Long-Term Stability Test>

Inventive Products 1 to 14 and Comparative Products 1 to 11 were each compounded at 5 mass % with the test emulsion resins, 80 ml of each product obtained was introduced by 80 ml into a 100-ml screw pipe, closed with a lid and allowed to stay for a week in a thermostat at 40° C. The external appearance of the emulsion resins thereafter was determined according to the following criteria.

⊚: homogeneous solution

○: no separation, but solution was partially heterogeneous (still can be used)

Δ: slight separation was confirmed

X: complete separation or sedimentation was confirmed

<Test 3: Water Solubility Confirmation Test>

Inventive Products 1 to 14 and Comparative Products 1 to 11 were each compounded at 5 mass % with pure water, 80 ml of the resultant systems were introduced into 100-ml screw pipes and closed with lids. The contents were then forcibly mixed by shaking the screw tubes vigorously up and down 10 times and allowed to stay for 30 min on a table. The external appearance thereafter was determined according to the following criteria.

○: complete separation

Δ: separation surface was partially emulsified

X: the entire content was homogeneous or emulsified

<Test 4: Water Resistance Test>

Inventive Products 1 to 14 and Comparative Products 1 to 11 were each compounded at 5 mass % with the resin 1, and 75-μm coating films were produced with an applicator on cleaned glass plates. After the coating films completely dried, the glass plates coated with the films were placed into warm water at 50° C., and whitening of the coating films was checked. The coating films that were whitened over a shorter period of time had less water resistance. The glass plates were checked every hour, the measurements were continued for 12 hrs, and the coating films that were not whitened after 12 hrs passed the test.

Test results obtained in compounding with the resin 1

TABLE 3

|  |  | Test 1 (° C.) | Test 2 | Test 3 | Test 4 |
|---|---|---|---|---|---|
| Inventive Products | 1 | 26.8 | ⊚ | ○ | Passed the test |
|  | 2 | 23.2 | ⊚ | ○ | Passed the test |
|  | 3 | 23.4 | ⊚ | ○ | Passed the test |
|  | 4 | 25.6 | ⊚ | ○ | Passed the test |
|  | 5 | 31.1 | ⊚ | Δ | 11 hrs |
|  | 6 | 23.3 | ○ | ○ | Passed the test |
|  | 7 | 23.4 | ⊚ | ○ | Passed the test |
|  | 8 | 23.2 | ⊚ | ○ | Passed the test |
|  | 9 | 31.8 | ○ | Δ | 9 hrs |
|  | 10 | 28.3 | ⊚ | ○ | Passed the test |
|  | 11 | 25.7 | ⊚ | ○ | Passed the test |
|  | 12 | 27.5 | ⊚ | ○ | Passed the test |
|  | 13 | 27.2 | ⊚ | ○ | Passed the test |
|  | 14 | 30.6 | ⊚ | Δ | 8 hrs |
| Comparative products | 1 | 26.7 | X | ○ | Passed the test |
|  | 2 | 23.3 | X | ○ | Passed the test |
|  | 3 | 23.6 | Δ | ○ | Passed the test |
|  | 4 | 23.5 | X | Δ | 9 hrs |
|  | 5 | 28.5 | Δ | ○ | Passed the test |
|  | 6 | 25.6 | Δ | ○ | Passed the test |
|  | 7 | 34.8 | X | Δ | 9 hrs |
|  | 8 | 42.6 | X | X | 2 hrs |
|  | 9 | 44.1 | X | X | 3 hrs |
|  | 10 | 29.3 | ⊚ | X | Passed the test |
|  | 11 | 24.2 | ⊚ | X | 10 hrs |
|  | 13 | 48.9 | ○ | — | Passed the test |

Comparative Product 13: blank (resin 1)

Test results obtained in compounding with the resin 2

TABLE 4

|  |  | Test 1 (° C.) | Test 2 |
|---|---|---|---|
| Inventive Products | 1 | 28.9 | ⊚ |
|  | 2 | 25.3 | ⊚ |
|  | 3 | 25.7 | ⊚ |
|  | 4 | 28.5 | ⊚ |
|  | 5 | 34.9 | ⊚ |
|  | 6 | 25.5 | ○ |
|  | 7 | 25.8 | ⊚ |
|  | 8 | 25.3 | ⊚ |
|  | 9 | 35.4 | ○ |
|  | 10 | 31.0 | ⊚ |
|  | 11 | 29.0 | ⊚ |
|  | 12 | 30.3 | ⊚ |
|  | 13 | 30.2 | ⊚ |
|  | 14 | 31.8 | ⊚ |
| Comparative products | 1 | 28.2 | X |
|  | 2 | 25.5 | X |
|  | 3 | 25.4 | Δ |
|  | 4 | 34.4 | X |
|  | 5 | 30.8 | X |
|  | 6 | 28.4 | Δ |
|  | 7 | 36.1 | X |
|  | 8 | 60.2 | X |
|  | 9 | 59.4 | X |
|  | 10 | 30.3 | ⊚ |
|  | 11 | 26.3 | ⊚ |
|  | 13 | 65.2 | ○ |

Comparative Product 13: Blank (Resin 2)

Comparative products 10 and 11 are the conventional film forming aids and demonstrate excellent performance, but the boiling point of butyl cellosolve, which is C-1, is 171° C. and the boiling point of N-methylpyrrolidone, which is C-2, is 202° C., and they are undesirable as additives under VOC restrictions. The boiling point of all of the samples A-1 to A-11 (with the exception of A-6) was 260° C. or higher.

The invention claimed is:

1. A film forming auxiliary agent composition for an emulsion resin, comprising: an ester compound (A) represented by general formula (1) and/or general formula (2) below; and a fatty acid represented by general formula (3) and/or general formula (4), and having an acid value of 0.05 to 5 mgKOH/g:

[Chemical Formula 1]

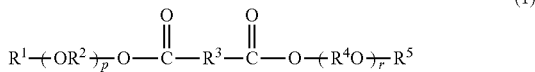
(1)

wherein $R^1$ and $R^5$ each represent a hydrocarbon group having a carbon number from 1 to 10; $R^2$ and $R^4$ each represent an alkylene group having a carbon number from 2 to 4; $R^3$ represents an alkylene group having a carbon number from 1 to 15; and p and r each represent a number from 1 to 5;

[Chemical Formula 2]

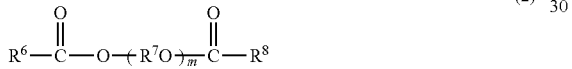
(2)

wherein $R^6$ and $R^8$ each represent a hydrocarbon group having a carbon number from 1 to 10; $R^7$ represents an alkylene group having a carbon number from 2 to 4; and m represents a number from 2 to 10;

$$HOOC-R^9-COOH \quad (3)$$

wherein $R^9$ represents an alkylene group having a carbon number from 1 to 15;

$$R^{10}-COOH \quad (4)$$

wherein $R^{10}$ represents a hydrocarbon group having a carbon number from 1 to 10.

2. The film forming auxiliary agent composition for an emulsion resin according to claim 1, wherein $R^2$ and $R^4$ in the general formula (1) and $R^7$ in the general formula (2) are each an ethylene group.

3. The film forming auxiliary agent composition for an emulsion resin according to claim 1, wherein the film forming aid composition is insoluble in water.

4. An emulsion resin composition containing, in an emulsion resin, the film forming auxiliary agent composition for an emulsion resin according to claim 1 at 0.1 mass % to 10 mass % based on the total amount of the emulsion resin composition.

5. The film forming auxiliary agent composition for an emulsion resin according to claim 2, wherein the film forming aid composition is insoluble in water.

6. An emulsion resin composition containing, in an emulsion resin, the film forming auxiliary agent composition for an emulsion resin according to claim 2 at 0.1 mass % to 10 mass % based on the total amount of the emulsion resin composition.

7. An emulsion resin composition containing, in an emulsion resin, the film forming auxiliary agent composition for an emulsion resin according to claim 3 at 0.1 mass % to 10 mass % based on the total amount of the emulsion resin composition.

8. An emulsion resin composition containing, in an emulsion resin, the film forming auxiliary agent composition for an emulsion resin according to claim 5 at 0.1 mass % to 10 mass % based on the total amount of the emulsion resin composition.

* * * * *